US010053009B2

(12) United States Patent
Kim

(10) Patent No.: US 10,053,009 B2
(45) Date of Patent: Aug. 21, 2018

(54) INTEGRATED OVERHEAD CONSOLE ASSEMBLY FOR VEHICLE

(71) Applicant: LG Electronics Inc., Seoul (KR)

(72) Inventor: Changhwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 14/935,923

(22) Filed: Nov. 9, 2015

(65) Prior Publication Data

US 2016/0129839 A1 May 12, 2016

(30) Foreign Application Priority Data

Nov. 10, 2014 (KR) .................. 10-2014-0155652

(51) Int. Cl.
*H04N 5/225* (2006.01)
*G07C 5/08* (2006.01)
*B60R 1/00* (2006.01)
*B60R 11/02* (2006.01)
*G06F 3/01* (2006.01)
*H04N 7/18* (2006.01)
*B60R 11/04* (2006.01)
*B60Q 3/74* (2017.01)
*B60Q 3/51* (2017.01)
*B60R 11/00* (2006.01)

(52) U.S. Cl.
CPC .................. *B60R 1/00* (2013.01); *B60Q 3/51* (2017.02); *B60Q 3/74* (2017.02); *B60R 11/0235* (2013.01); *B60R 11/04* (2013.01); *G06F 3/013* (2013.01); *G07C 5/0891* (2013.01); *H04N 5/2253* (2013.01); *H04N 5/2254* (2013.01); *H04N 5/2258* (2013.01);
*H04N 7/181* (2013.01); *B60R 2011/0028* (2013.01); *B60R 2300/207* (2013.01); *B60R 2300/8026* (2013.01)

(58) Field of Classification Search
CPC ... B60R 1/00; B60R 11/04; B60R 2300/8026; B60R 2300/207; B60R 2011/0028; G07C 5/0891; H04N 5/2254; H04N 5/2253; H04N 5/2258; H04N 7/181; G06F 3/013; B60Q 3/74; B60Q 3/0279; B60Q 3/0203
USPC ........................................................ 348/148
See application file for complete search history.

(56) References Cited

U.S. PATENT DOCUMENTS

| 6,979,038 B1 | 12/2005 | Cho et al. | |
|---|---|---|---|
| 7,195,381 B2 * | 3/2007 | Lynam | B60K 35/00 362/294 |
| 2002/0003571 A1 * | 1/2002 | Schofield | B60C 23/00 348/148 |

(Continued)

FOREIGN PATENT DOCUMENTS

| JP | 2010-125908 A | 6/2010 |
|---|---|---|
| KR | 10-2009-0035510 A | 4/2009 |

(Continued)

*Primary Examiner* — Andy Rao
*Assistant Examiner* — Zaihan Jiang
(74) *Attorney, Agent, or Firm* — Birch, Stewart, Kolasch & Birch, LLP

(57) ABSTRACT

An integrated overhead console assembly for a vehicle includes a camera module for taking a forward image of a vehicle in a direction of travel, a multi-display unit for displaying an image taken by the camera module, and various functional operation components of the vehicle that are efficiently incorporated in a single overhead console assembly to improve user convenience.

18 Claims, 7 Drawing Sheets

(56) References Cited

U.S. PATENT DOCUMENTS

| | | |
|---|---|---|
| 2003/0043590 A1 | 3/2003 | Walser et al. |
| 2004/0246607 A1 | 12/2004 | Watson et al. |
| 2008/0117031 A1* | 5/2008 | Chiang .................. B60Q 9/008 340/425.5 |
| 2009/0201583 A1* | 8/2009 | Kamada ............ B32B 17/10036 359/485.02 |
| 2010/0133410 A1 | 6/2010 | Gruener et al. |
| 2010/0289995 A1 | 11/2010 | Hwang et al. |
| 2011/0267700 A1* | 11/2011 | Schliep .............. G02B 27/0101 359/630 |
| 2012/0200490 A1 | 8/2012 | Inada |
| 2013/0214548 A1 | 8/2013 | Harders et al. |
| 2014/0043479 A1 | 2/2014 | Busch et al. |
| 2014/0313337 A1 | 10/2014 | Devota et al. |

FOREIGN PATENT DOCUMENTS

| | | |
|---|---|---|
| KR | 10-2010-0016363 A | 2/2010 |
| KR | 10-2010-0123433 A | 11/2010 |
| KR | 10-1154018 B1 | 6/2012 |
| KR | 10-2013-0069772 A | 6/2013 |
| WO | WO 2011/030958 A1 | 3/2011 |
| WO | WO 2013/077682 A1 | 5/2013 |

\* cited by examiner

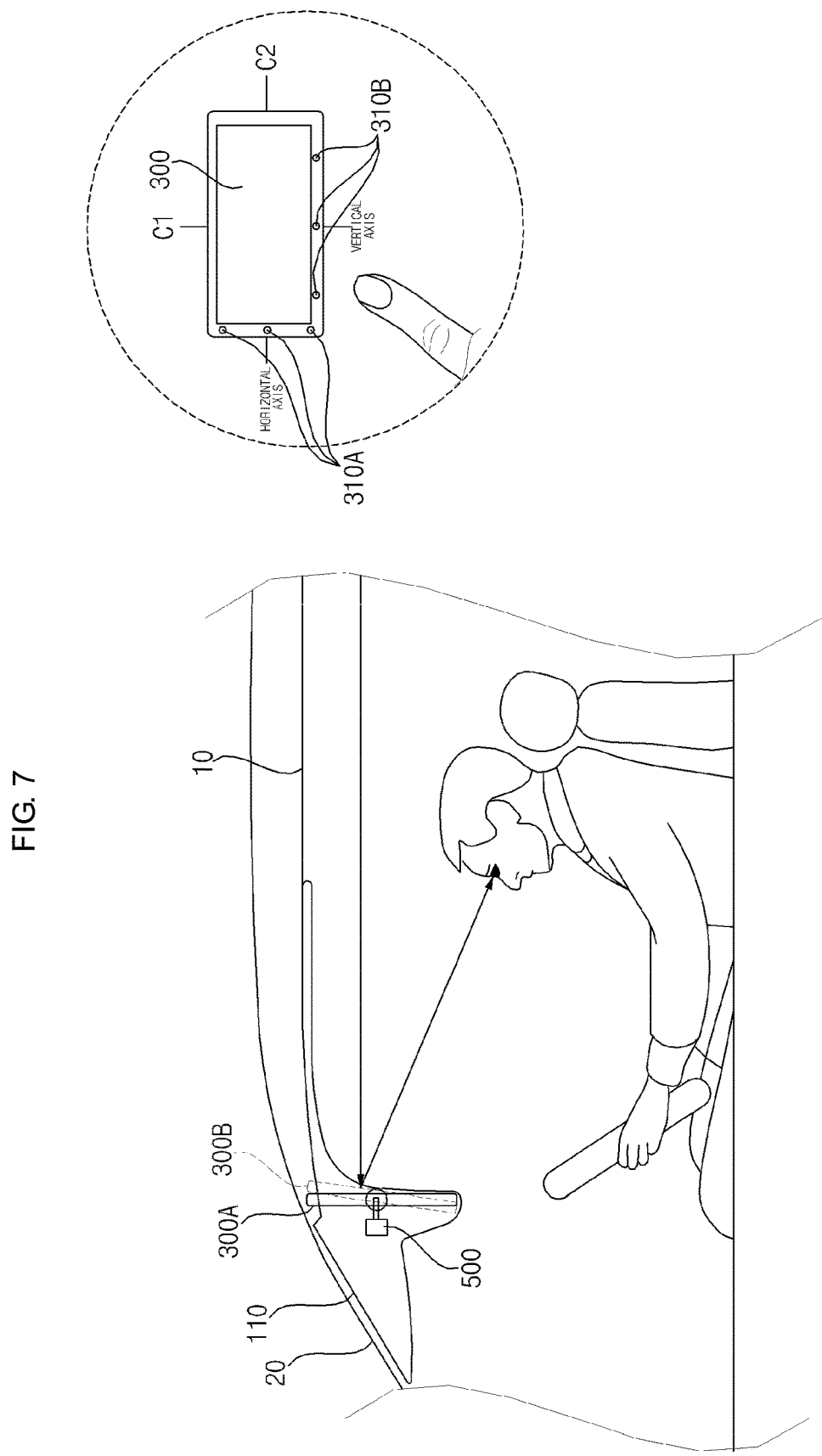

INTEGRATED OVERHEAD CONSOLE ASSEMBLY FOR VEHICLE

CROSS-REFERENCE TO RELATED APPLICATION

This application claims the priority benefit of Korean Patent Application No. 10-2014-0155652, filed on Nov. 10, 2014 in the Korean Intellectual Property Office, the disclosure of which is incorporated herein by reference.

BACKGROUND OF THE INVENTION

1. Field of the Invention

The present invention relates to an integrated overhead console assembly for a vehicle, and more particularly, to an integrated overhead console assembly for a vehicle in which various functional operation components of a vehicle are compactly installed at a windshield in a vehicle interior and a roof panel adjacent to the windshield so as to prevent interference with a user's field of view during driving and to reduce the number of assembly processes for improvement in worker's convenience.

2. Description of the Related Art

A vehicle may be usually provided with an interior illumination unit which is positioned at a roof panel adjacent to a windshield installed in the front of a vehicle interior so as to radiate a certain light toward the driver and front passenger seats, and a sunglasses box for accommodating a user's sunglasses may also be provided at the roof panel in some cases.

Furthermore, recently, a GPS receiver and an electronic toll collection terminal as well as a black box camera are also installed at a region of a vehicle interior adjacent to a windshield.

In addition, a user's favorite belongings such as toys and air fresheners may also be attached to a front region of a vehicle interior.

A front area in front of the driver and front passenger seats in a vehicle interior should not interfere with a driver's field of view during driving. Nevertheless, various components are attached to the front area that interfere with a driver's field of view during driving, thus making it difficult to assure safe driving.

Furthermore, since vehicle assembly workers have to install the many components delivered from respective manufacturers to vehicles, the number of assembly processes is increased.

In addition, users may suffer problems in that the various components are unsteadily attached or installed to a vehicle rather than being securely fixed to the vehicle and thus displacement and detachment of the components and noise are caused by vibration.

SUMMARY OF THE INVENTION

Therefore, the present invention has been made in view of the above problems, and it is an object of the present invention to provide an integrated overhead console assembly for a vehicle, which does not interfere with a user's field of view for the sake of safe driving, and reduces the number of assembling processes for the sake of improvement in assembly convenience.

In accordance with an aspect of the present invention, the above and other objects can be accomplished by the provision of an integrated overhead console assembly for a vehicle, including a camera module disposed in a vehicle interior to take a forward image of a vehicle in a direction of travel, the camera module comprising a lens for converging light constituting the forward image, an image sensor coupled to a rear end of the lens to detect the image converged through the lens, and an image processing board horizontally disposed below the lens and the image sensor and electrically connected to the image sensor, a multi-display unit for providing a driver with a display of the forward image taken through the camera module or reflection of a rear view image of the vehicle in real time, and an overhead console case for providing an installation space for accommodating the camera module and the multi-display unit such that the camera module is hidden from the vehicle interior whereas the multi-display unit is exposed to the vehicle interior, wherein the multi-display unit may be spaced apart from the image processing board by a predetermined distance or more.

The overhead console case may include a front end part coupled to a windshield glass bracket attached to an inner surface of a windshield glass, and a rear end part coupled to a roof inner panel constituting a ceiling surface of the vehicle interior.

The integrated overhead console assembly may further include an interior illumination unit provided at a rear end of the overhead console case which is positioned opposite the camera module with respect to the multi-display unit so as to radiate light to the vehicle interior.

The interior illumination unit may include an LED module disposed in the overhead console case to radiate a predetermined amount of light, a printed-circuit board to which the LED module is soldered, a contactor soldered to the printed-circuit board, and a push type projector for pushing the contactor to switch the interior illumination unit and for radiating the light emitted from the LED module, wherein the push type projector may constitute part of a lower surface of the overhead console case.

The push type projector may be arranged along a marginal region of a rear end of the overhead console case to have a "U" shape.

The overhead console case may include therein a microphone for detecting and storing sound generated from the vehicle interior, a black box for converting an image taken by the camera module and the sound detected by the microphone into data and storing the data therein, and a film speaker for outputting predetermined sound to the vehicle interior, wherein when it is determined that there is a safety risk in running of the vehicle based on analysis of a forward image of a vehicle in a direction of travel taken by the camera module, a predetermined alarm sound may be output to the vehicle interior through the film speaker, sound in the vehicle interior detected by the microphone and the image are converted into data and stored in the black box, and the forward image of the vehicle is displayed through the multi-display unit.

The multi-display unit may display the image data stored in the black box according to user selection.

The overhead console case may further include therein a transceiver for radio communication with a portable radio terminal, wherein the forward image of the vehicle taken by the camera module and the image and sound stored in the black box may be checked through radio communication between the transceiver and the portable radio terminal according to user selection, and wherein data stored in the portable radio terminal may be checked through radio communication between the transceiver and the multi-display unit according to user selection.

The camera module may include a camera holder through which the camera module is coupled to the windshield bracket, a mounting part to which a plurality of lenses and a plurality of image sensors are coupled in a state of being longitudinally spaced apart from each other and through which the lenses and the image sensors are coupled to an upper surface of the camera holder, and a lower cover assembly which accommodates an image processing board and through which the image processing board is coupled to a lower surface of the camera holder, wherein the lower cover assembly may be made of highly thermally conductive material, and may be in contact with a heat generating region of the image processing board.

The multi-display unit may include an image output LED module, wherein the integrated overhead console assembly may further include a thermal insulating member disposed in a space between the image sensor and the multi-display unit to prevent thermal interference between the image sensor and the image output LED module.

The lower cover assembly may include an upper heat dissipation bracket disposed between the camera holder and the lower cover assembly to dissipate heat generated from the image processing board, and a lower heat dissipation bracket coupled to the upper heat dissipation bracket with the image processing board disposed therebetween, wherein a heat generating region of the image processing board may be in contact with a heat transfer portion formed at an inner surface of the lower heat dissipation bracket.

One of the upper heat dissipation bracket and the lower heat dissipation bracket may be bent at a rear end thereof to partition a space defined between the upper and lower dissipation brackets.

The camera module, the multi-display unit and the interior illumination unit may be provided with power supplied through a single wire wired in the overhead console case.

The multi-display unit may be moved so as to adjust a projection angle of a display surface for outputting an image.

The overhead console case may include therein a moving mechanism for moving the multi-display unit so as to adjust a projection angle of the display surface.

The overhead console case may include therein a detector for monitoring a user's line of sight, wherein the multi-display unit may be moved so as to adjust a projection angle of an image output display surface in a predetermined direction in accordance with a user's line of sight detected by the detector.

The multi-display unit may be moved so as to adjust a projection angle of a display surface for reflecting a rear view image of the vehicle to a driver, and wherein the multi-display unit may include a plurality of indicating switching elements which are spaced apart from one another in horizontal and vertical directions so as to adjust moving extents of the multi-display unit in the horizontal and vertical directions by driver manipulation.

The multi-display unit may include a display panel disposed in the front of the multi-display unit to display an image taken by the camera module, and a reflection panel disposed behind the display panel and containing a polarization component to reflect and project a rear view image of the vehicle to a driver under inactive conditions of the multi-display unit, wherein the polarization component may include one of polarized glass containing a polarization material, a polarization film containing a polarization material, and a material that is discolored upon application of power.

The integrated overhead console assembly may further include a rear camera module for taking a rear view image of the vehicle, and a both sides and rear camera module for taking images of side views and a rear view of the vehicle, wherein the display panel may include at least two split display surfaces for concurrently displaying respective images taken by the camera module, the rear camera module, and the both sides and rear camera module.

The display panel may display all images taken by the camera module, the rear camera module, and the both sides and rear camera module in a panoramic fashion.

The multi-display unit may include an indicator element for indicating operational states of various functional operation components provided in the vehicle, wherein the indicator element may be displayed through the multi-display unit when a driver or passenger intention to operate the indicator element is detected.

The driver or passenger intention to operate the indicator element may be determined by detection of a driver or passenger access or touch.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a schematic view showing a structure for moving the multi-display unit of FIG. 1.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understand of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present.

A singular representation may include a plural representation unless it represents a definitely different meaning from the context.

Terms such as "includes" or "has" used herein should be understood that they are intended to indicate presence of several components, functions or steps, disclosed in the specification, and it is also understood that more or fewer components, functions, or steps may likewise be utilized.

Figure 1:
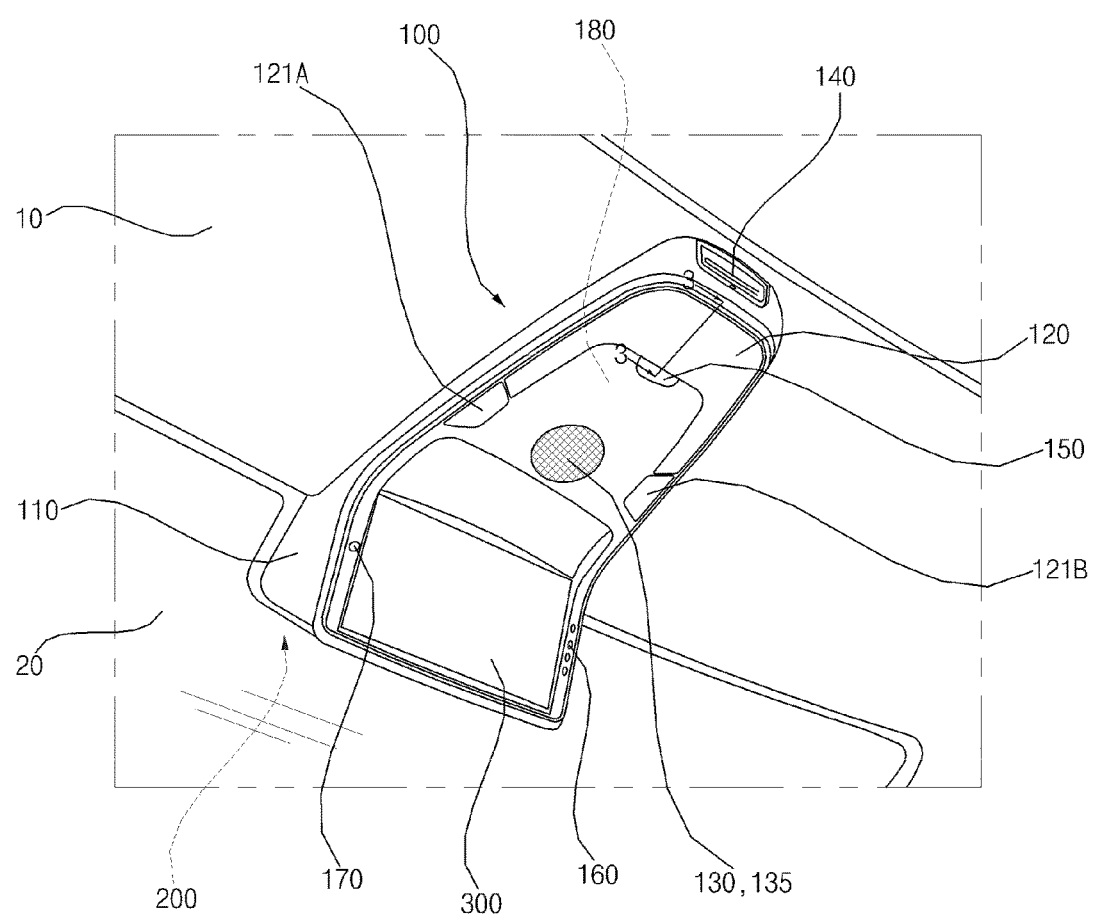
FIG. 1 is a perspective view showing an integrated overhead assembly for a vehicle according to a preferred embodiment of the present invention.
Figure 2:
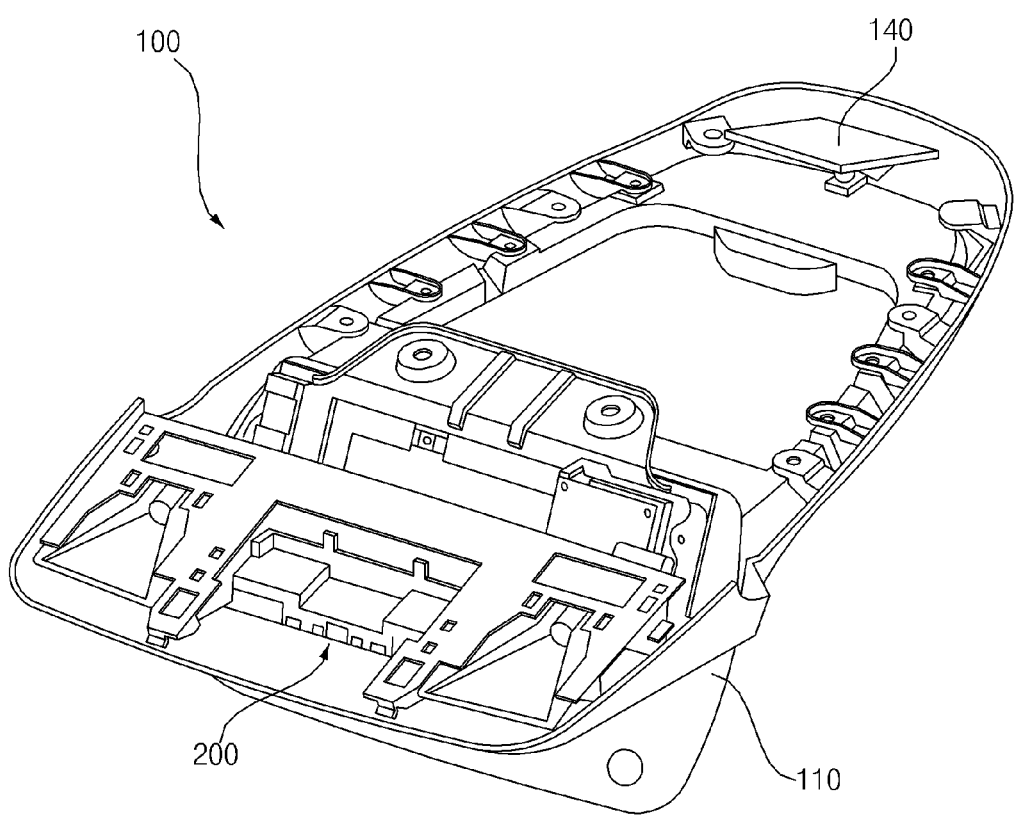
FIG. 2 is a perspective view showing an upper part of the integrated overhead assembly shown in FIG. 1.
Figure 3:
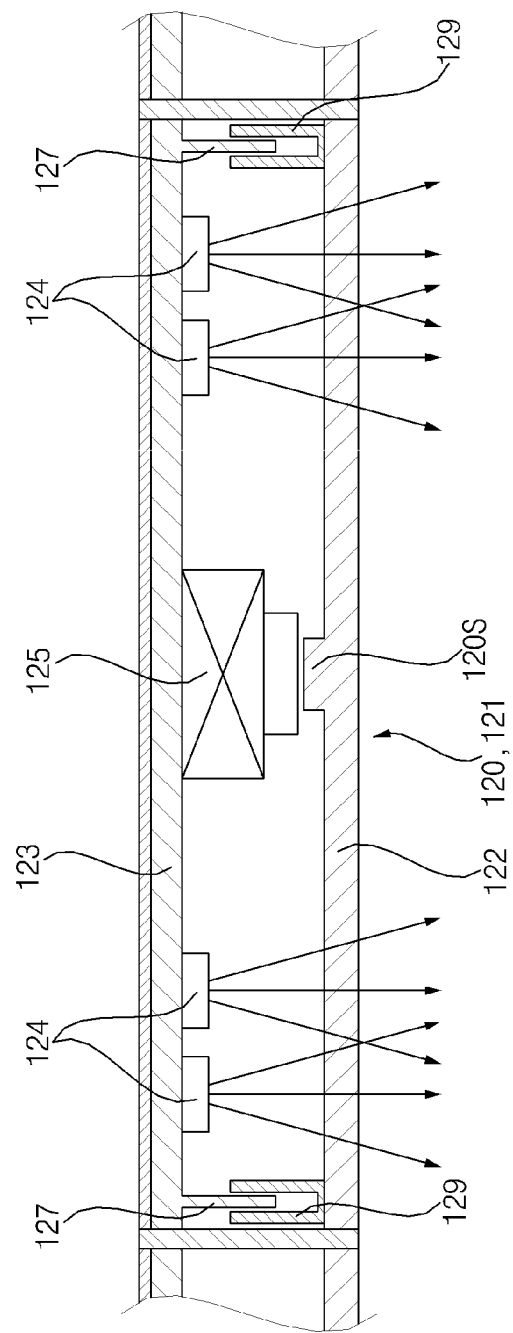
FIG. 3 is a cross-sectional view taken along line 3-3 of FIG. 1.
Figure 4:
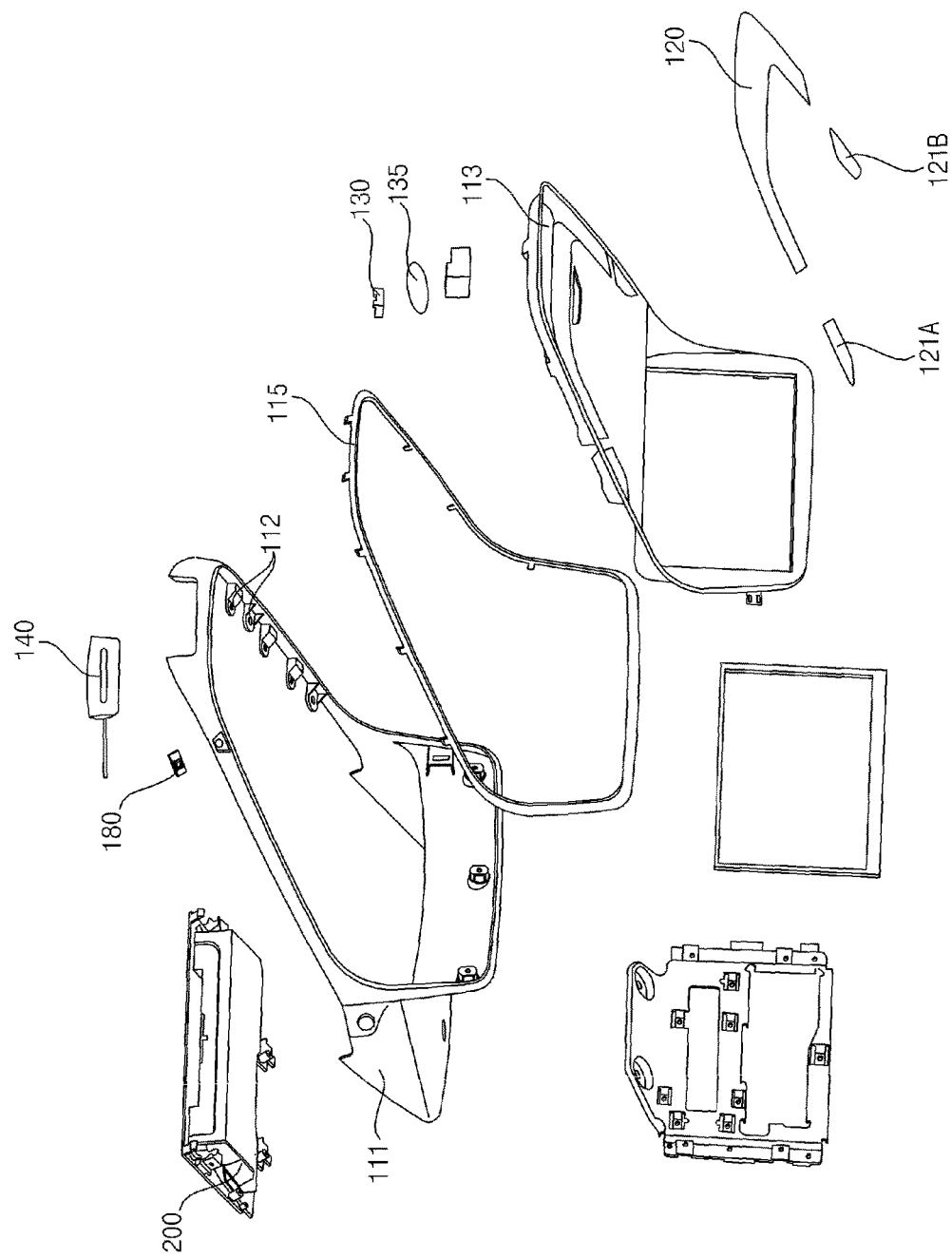
FIG. 4 is an exploded perspective view of FIG. 1.
Figure 5:
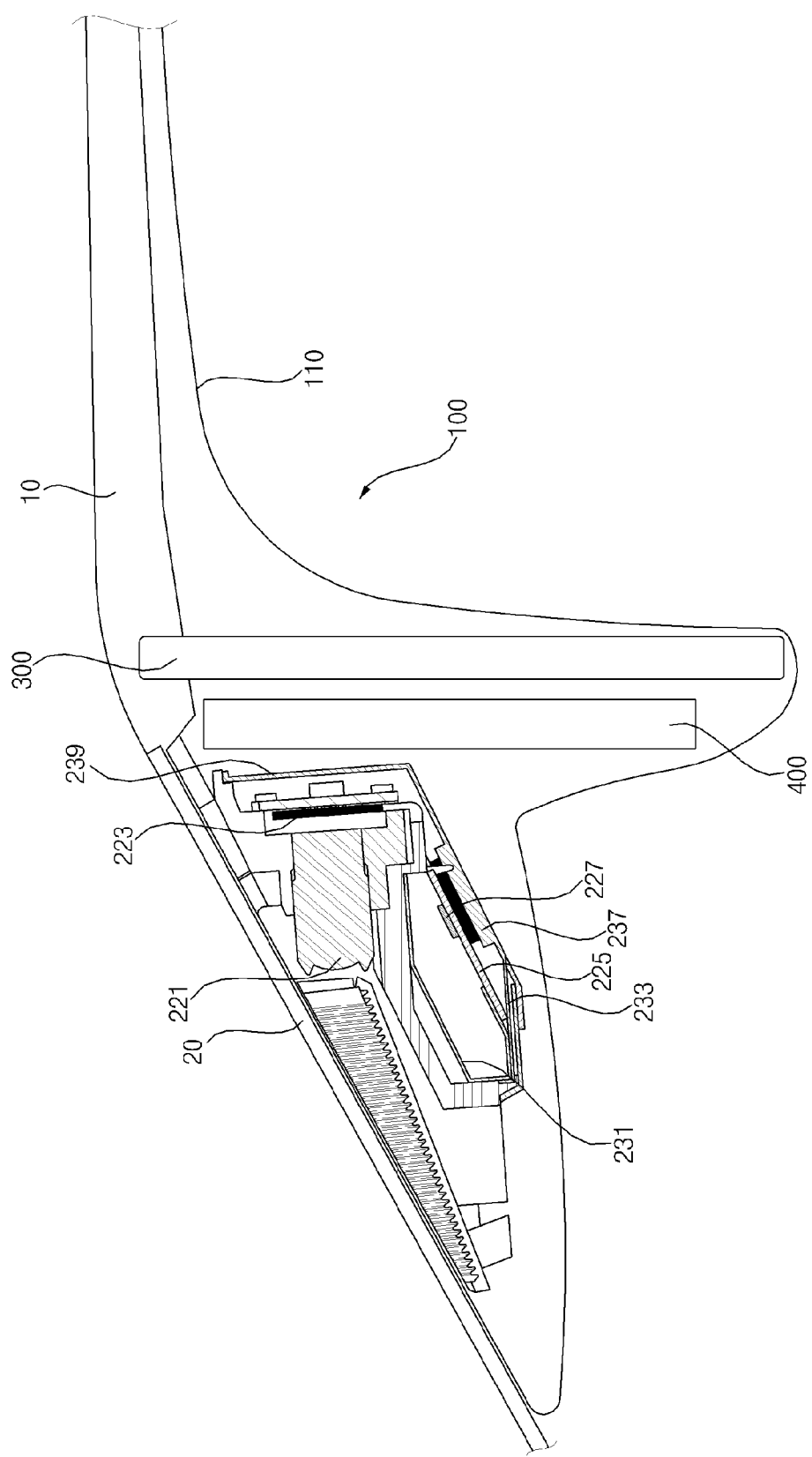
FIG. 5 is a cross-sectional view showing an installed state of the integrated overhead assembly for a vehicle according to the preferred embodiment of the present invention.

FIG. 1 is a perspective view showing an integrated overhead assembly for a vehicle according to a preferred embodiment of the present invention. FIG. 2 is a perspective view showing an upper part of the integrated overhead assembly shown in FIG. 1. FIG. 3 is a cross-sectional view taken along line 3-3 of FIG. 1. FIG. 4 is an exploded perspective view of FIG. 1. FIG. 5 is a cross-sectional view showing an installed state of the integrated overhead assembly for a vehicle according to the preferred embodiment of the present invention.

As illustrated in FIGS. 1 to 5, the integrated overhead assembly 100 for a vehicle according to the preferred embodiment of the present invention includes a camera module 200, a multi-display unit 300, an interior illumination unit 120-121, a microphone 130, a film speaker 135, a black box (not shown), and an overhead console case 110 for accommodating various functional operation components.

The overhead console case 110 includes a front end part extending toward a windshield 20 by a predetermined length to surround the camera module 200 coupled to a windshield glass bracket (not shown) attached to an inner surface of a windshield 20, and a rear end part extending rearward by a predetermined length and coupled to a roof inner panel 10 constituting a ceiling surface of a vehicle interior.

The multi-display unit 300 functions to display a forward image viewed from a vehicle taken through the camera module 200 to a driver in real time, or to reflect an image of a rear view image of a vehicle to display the rear image to a driver.

More specifically, the multi-display unit 300 serves as a rearview mirror for reflecting a rear view image of a vehicle to a driver at normal times but selectively displays a forward image of the vehicle in a direction of travel taken by the camera module 200 according to user selection.

Specifically, when there is provided a display panel for displaying an image taken by the camera module 200, the multi-display unit 300 serving as a rearview mirror may adopt any construction for inactivating the function of the rearview mirror while an image is output on the display panel, but reflecting a rear view image of a vehicle while an image is not output through the display panel. A detailed description thereof will be given later.

The overhead console case 110 provides an installation space for accommodating the camera module 200 and the multi-display unit 300 in such a manner as to hide the camera module 200 from a vehicle interior while exposing the multi-display unit 300 to the vehicle interior.

As illustrated in FIG. 4, the overhead console case 110 may include a main case 111 coupled to the windshield bracket and the roof inner panel 10 to shield or hide a lower part of the camera module 200 from a vehicle interior, a sub case 113 attached to the main case 111 to support the multi-display unit 300 coupled to the main case 111 and to provide an installation place for various functional operation components such as the camera module 200, the multi-display unit 300 and the like, and a decorative member 115 interposed between marginal areas of the main case 111 and the sub case 113.

The main case 111 includes a windshield coupler (not shown) for the windshield bracket, and roof couplers 112 for the roof inner panel 10, so as to securely couple the main case 111 to a corresponding region of a vehicle interior.

The rear end part of the overhead console case 110, which is disposed opposite the camera module 200 with respect to the multi-display unit 300, may be provided with the interior illumination unit 120-121 for radiating light to a vehicle interior.

More specifically, the sub case 113 of the overhead console case 110 extends rearward by a predetermined length to occupy a part of the roof inner panel 10, and the interior illumination unit 120-121 is arranged along a peripheral portion of a rear end part of the sub case 113 to have a predetermined shape.

The interior illumination unit 120-121 may include a main lamp part 120 which radiates light at a predetermined illuminance to irradiate a front section of a vehicle interior corresponding to a driver's seat and a front passenger's seat when turned on, and a pair of sub lamp parts 121 disposed at both sides of a front end of the main lamp 120 corresponding to the driver's seat and the front passenger's seat, respectively, which radiate light at a predetermined illuminance to irradiate the driver seat and the front passenger seat, respectively, when turned on.

As illustrated in FIGS. 1 and 3, the main lamp part 120 is disposed along a U-shaped marginal region of a rear end of the sub case 113, and the pair of sub lamp parts 121 is disposed close to both front ends of the U-shaped main lamp 120 and extend therefrom.

As illustrated in FIG. 3, the interior illumination unit 120-121, which is constructed in the above-described manner, may include LED modules 124 attached to a lower surface of the sub case 113 of the overhead console case 110 to emit light at a predetermined illuminance, a printed-circuit board 123 to which the LED modules 124 are soldered, a contactor 125 soldered to the printed-circuit board 123, and a push type projector 122 for radiating the light emitted from the LED modules 124.

The push type projector 122 may constitute a part of a lower surface of the sub case 113 of the overhead console case 110.

More specifically, the push type projector 122 is preferably made of a transparent or translucent material to allow the light emitted from the LED modules 124 to be transmitted to the vehicle interior. The push type projector 122 may be a switch actuator which is moved upward to press the contactor 125 when being pushed upward by a user. The contactor 125 is preferably composed of a tactile switch.

The push type projector 122 may be provided at an upper surface thereof with a contact protrusion which protrudes toward the contactor 125. The push type projector 122 is provided at ends of an upper surface thereof with guide grooves 129 in which guide ribs 127 protruding from the printed-circuit board 123 toward the push type projector 122 are fitted when the push type projector 122 is pushed.

The push type projector 122 may be guided by virtue of cooperation of the guide ribs 127 and the guide grooves 129 upon push action. As described above, the push type projector 122 may be configured into a "U" shape conforming to the marginal region of the rear end part of the sub case 113 of the overhead console case 110.

In the above description of the integrated overhead console assembly 100 for a vehicle according to the preferred embodiment of the present invention, although the specific configuration of the interior illumination unit 120-121 has been described focusing on the configuration of the main lamp part 120 with reference to FIGS. 1 and 3, the substantial configuration of the main lamp part 120 may also be applied to the sub lamp parts 121.

As illustrated in FIGS. 1 and 4, the integrated overhead console assembly 100 for a vehicle according to the preferred embodiment of the present invention may further include, in the overhead console case 110, a microphone 130 for detecting and storing sound in a vehicle interior, a black box for converting an image taken by the camera module 200 and the sound detected by the microphone 130 into data and storing the data therein, and a film speaker 135 for outputting predetermined sound to the vehicle interior.

The microphone 130 may function to detect sound in a vehicle interior, particularly a driver or passenger voice as a specific instruction signal and to receive operation instruction signals for various functional operation components of the vehicle in real time.

As already known in the art, the black box refers to a device that includes a storage unit for converting an image (including an image unit) collected by various image capturing devices and sounds collected by various sound detection devices into data and storing the data therein, and that outputs the data information depending on user's needs. In a preferred embodiment of the present invention, the black box serves as a typical black box that converts a forward image of a vehicle in a direction of travel into data for storage therein in real time and converts sounds detected by the microphone 130 into data for storage therein in real time. Furthermore, the black box is accommodated in the overhead console case 110 without the need for an additional installation space.

The film speaker 135 generally refers to a speaker that is composed of a piezoelectric film capable of allowing current to flow therethrough and coated with a specific film to convert vibration into sound. The film speaker 135 may be easily installed in a space having a small vertical height between a lower surface of the sub case 113 of the overhead console case 110 and a cover member (not shown).

In the integrated overhead console assembly 100 for a vehicle according to the preferred embodiment of the present invention, when it is determined that there is a risk in travel of a vehicle, based on analysis of a forward image of the vehicle in a direction of travel taken by the camera module 200, a predetermined alarm sound may be output to a vehicle interior through the film speaker 135. At the same time, sounds in the vehicle interior detected by the microphone 130 and the image may be converted into data and stored in the black box, and the forward image of the vehicle may be displayed through the multi-display unit 300.

In particular, the multi-display unit 300 may be constructed to display image data stored in the black box depending on user selection. More specifically, when an accident occurs during travel, a user checks the image data and the sound data stored in the black box through the multi-display unit 300 so as to clearly clarify the cause of the accident, responsibility and the like.

The overhead console case 110 may be further provided therein with a transceiver (not shown) for radio communication with a portable radio terminal (not shown). The transceiver may function to relay radio communication between a portable radio terminal and an electronic control unit (ECU) of a vehicle and to enable radio communication at a domain at which a specific frequency of a portable radio terminal is detected.

In particular, the transceiver may function to enable a forward image of a vehicle in a direction of travel taken by the camera module 200 and images and sounds stored in the black box to be checked by a portable radio terminal through radio communication while enabling data stored in the portable radio terminal to be checked by the multi-display unit 300 and the film speaker 135.

In the integrated overhead console assembly 100 according to an embodiment of the present invention, the overhead console case 110 may further include an electronic toll collection terminal unit 140. As illustrated in FIG. 1, the electronic toll collection terminal unit 140 includes a card insertion slot formed at a rear end of the sub case 113 to allow an electronic toll collection card to be inserted thereinto in a forward direction.

When an electronic toll collection card is inserted into the card insertion slot and thus electrically connected to the electronic toll collection terminal unit 140, a vehicle equipped with the electronic toll collection terminal unit 140 may conveniently pass through toll facilities such as a toll gate without having to stop.

As illustrated in FIG. 1, the overhead console case 110 may include a driven state monitoring (DSM) unit 170 for monitoring a driver's face and the like to prevent drowsy driving. Although not shown in the drawings, the driven state monitoring unit 170 may include a camera device capable of recognizing a driver's face including pupils. The driven state monitoring unit 170 determines whether a driver's current state is suitable for normal driving or whether the driver's current state is drowsy according to a predetermined algorithm, based on variation of driver's pupils or face and the like. When it is determined that the driver is drowsy driving, the driven state monitoring unit 170 may warn the driver of drowsy driving through the film speaker 135.

As illustrated in FIG. 1, the overhead console case 110 may further include an emergency call unit 150. The emergency call unit 150, which may also be referred to as "E-call", functions to try emergency phone communication with a certain user or rescue facility (such as a hospital and a fire department) in a time of emergency such as vehicle accident and to enable call connection to the counter party through the microphone 130 and the film speaker 135.

As further illustrated in FIG. 1, the overhead console case 110 may further include a theft detection unit 180 for detecting an infrared object present in a vehicle interior. The theft detection unit 180 may be composed of an infrared sensor for detecting an infrared object present in a vehicle interior. When there is an unallowable intrusion of a third party into a vehicle interior of a stopped or parked vehicle, an infrared ray is detected by the theft detection unit 180. When the detection result by the theft detection unit 180 is determined to be an intrusion of a third party, a warning through the film speaker 135 and a reliable report procedure to the police through the emergency call unit 150 may be performed.

As further illustrated in FIG. 1, the overhead console case 110 may include seat belt indicators 160 which recognize passengers sitting on all the respective seats in a vehicle interior and indicate whether the passengers sitting on the seats are wearing respective seat belts. The seat belt indicators 160 are preferably provided to correspond in number to all the seats and are preferably composed of LEDs to emit light of predetermined colors.

As described above, since the integrated overhead console assembly 100 according to the preferred embodiment of the present invention is constructed such that a plurality of functional operation components for improving user convenience are compactly installed thereat, interference to a driver's field of view during driving is advantageously decreased as much as possible, thus assuring safe driving.

Figure 6:
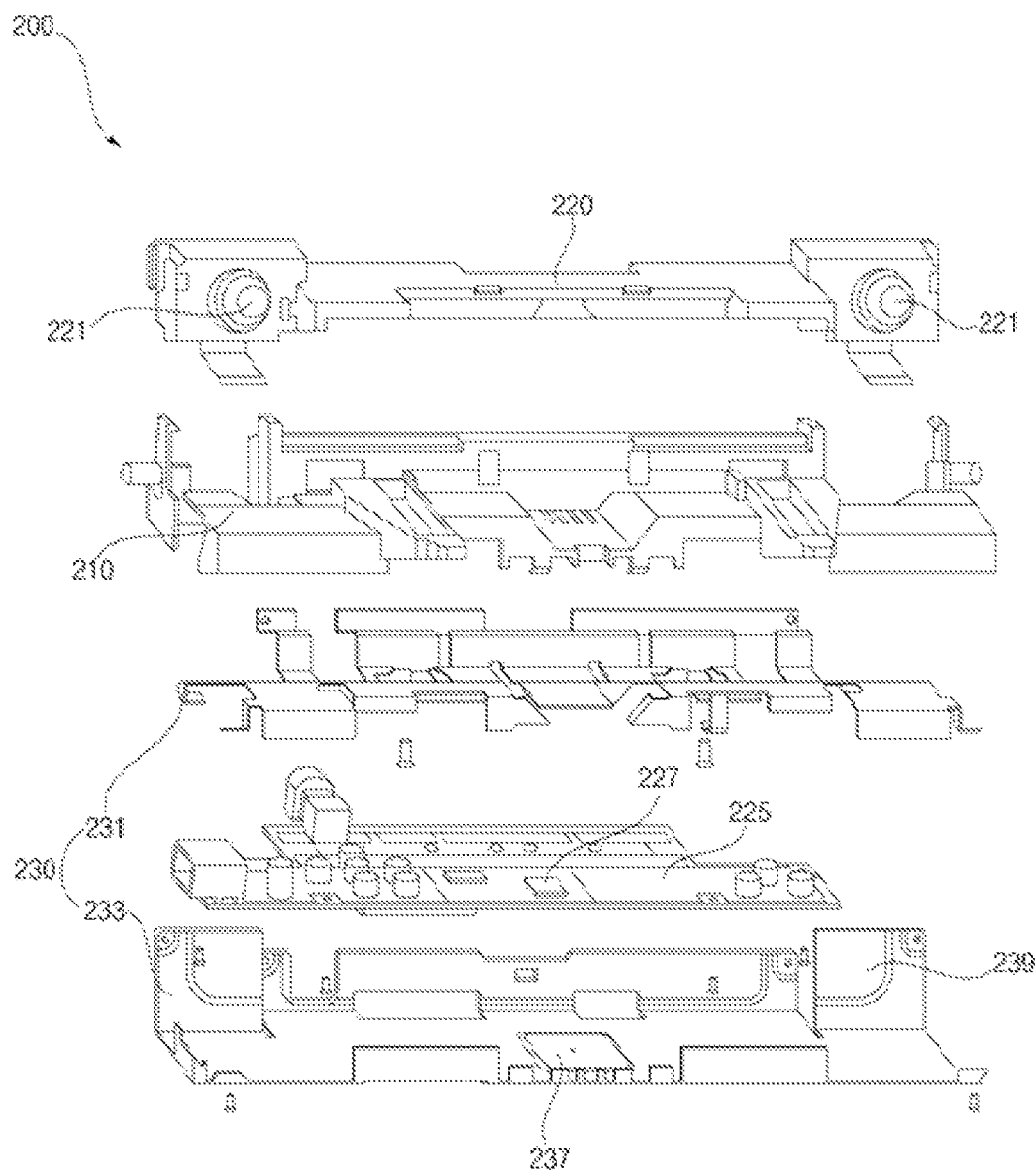
FIG. 6 is an exploded perspective view showing the camera module of FIG. 1.

FIG. 6 is an exploded perspective view showing the camera module of FIG. 1.

As illustrated in FIG. 6, in the integrated overhead console assembly 100 according to the preferred embodiment of the present invention, the camera module 200 may include a camera holder 210 through which the camera module 200 is coupled to the windshield bracket, a mounting part 220 to which a plurality of lenses 221 and a plurality of image sensors 223 are coupled in a state of being longitudinally spaced apart from one another and through which the lenses 221 and the image sensors 223 are coupled to an upper surface of the camera holder 210, and a lower cover assembly 230 which accommodates an image processing board 225 and through which the image processing board 225 is coupled to a lower surface of the camera holder 210.

Although the camera module 200 may be constructed into a single type including only one lens 221, the preferred embodiment of the present invention is described as being constructed into a stereo type in which images of at least two forward views of a vehicle in a direction of travel are concurrently created by a pair of lenses 221 so as to instantly obtain three-dimensional state information of an object placed within a focal length.

The lenses 221 are intended to converge forward light, which is projected in a direction of travel therethrough and each of which has a predetermined angle of view, on the respective image sensors 223. Each of the image sensors 223 may be a charge-coupled device in which a large number of photodiodes are integrated so as to create a predetermined image by electrons generated from a predetermined amount of light converging through the lens 221.

As illustrated in FIG. 6, the pair of lenses 221 are fixed to the opposite ends of the mounting part 220 made of rigid material such that each has a predetermined angle of view converging on the pair of lenses 221. The pair of lenses 221 fixed to the mounting part 220 is coupled to the camera holder 210 through the mounting part 220.

The camera holder 210 is provided therein with the image processing board 225, and the camera holder 210 and the image processing board 225 are electrically connected to each other so as to share image information created by the image sensors 223. The image processing board 225 functions to process the images created by the image sensors 223 to be output through the multi-display unit 300.

The image sensors 223 and the image processing board 225 are provided with respective electric elements which generate a certain amount of heat during creation or processing of images. Therefore, the generated heat disadvantageously deteriorates performances of the electric elements.

As for example illustrated in FIGS. 5 and 6, the image sensors 223 are disposed behind the respective lenses 221, and the image processing board 225 is horizontally disposed below the lenses 221 and the image sensors 223 and extends laterally. The image sensors 223 are provided as electric elements, and the image processing board 225, which serves as a kind of main board, may be provided with a heat generating electric element 227 serving as a CPU of a computer. In particular, since the electric element generates heat and thus increases in temperature to about 87.2° C. or higher during operation, performance of the electric element is extremely deteriorated, thus necessitating a construction for heat dissipation.

As illustrated in FIGS. 5 and 6, in the construction for heat dissipation of the integrated overhead console assembly 100 for a vehicle according to the preferred embodiment of the present invention, the lower cover assembly 230 may be made of highly thermally conductive material, and the heat generating region of the image processing board 225 may be configured to be in contact with the lower cover assembly 230. In other words, the lower cover assembly 230 made of highly thermally conductive material may be in direct contact with the heat generating region of the image processing board 225, thus improving heat dissipation performance.

More specifically, the lower cover assembly 230 may be provided with a heat transfer member 237 protruding forward from the image processing board 225, and the heat transfer member 237 may be in contact with a back surface of the heat generating electric element 227 of the image processing board 225.

Referring to FIG. 5, the lower cover assembly 230 may include an upper heat dissipation bracket 231 disposed between the camera holder 210 and the lower cover assembly 230 to dissipate heat generated from the image processing board 225, and a lower heat dissipation bracket 233 coupled to the upper heat dissipation bracket 231 with the image processing board 225 disposed therebetween, thus providing a space for installation of the image processing board 225. Here, the heat transfer member 237 is preferably formed at an inner surface of the lower heat dissipation bracket 233.

Provided between the image processing board 225 and the multi-display unit 300 may be a partition 239 that is constructed in such a way that a rear end of one of the upper heat dissipation bracket 231 and the lower heat dissipation bracket 233 is bent to partition the space defined between the upper and lower dissipation brackets 231 and 233. Specifically, since the partition 239 of the lower cover assembly 230 is disposed to divide the space between the image processing board 225 and the multi-display unit 300, it is possible to prevent heat generated from the image processing board 225 from affecting the multi-display unit 300 and to prevent heat generated from the multi-display unit 300 from affecting the image processing board 225. Furthermore, the partition 239 may be disposed behind and close to the image sensor 223 so as to absorb heat generated from the image sensor 223 and thus to dissipate the heat through the lower cover assembly 230.

The multi-display unit 300 includes an image output LED module (not shown). The image output LED module, which is composed of a plurality of high brightness LEDs, has its own heat dissipation structure, similarly to the image sensors 223 or the image processing board 225.

Referring to FIG. 5, the integrated overhead console assembly 100 for a vehicle according to the preferred embodiment of the present invention may include a thermal insulating member 400 disposed in the space between the image sensors 223 and the multi-display unit 300 to prevent thermal interference between the image sensors 223 and the image output LED modules.

The thermal insulating member 400 may adopt any configuration regardless of material so long as it divides the internal space of the overhead console case 110 into a front space which accommodates the camera module 200 and a rear space which accommodates the multi-display unit 300 so as to block heat transfer between both the spaces.

FIG. 7 is a schematic view showing a structure for moving the multi-display unit of FIG. 1.

The multi-display unit 300 may be moved so as to adjust a projection angle of a display surface outputting an image (including a still image). The fact that the multi-display unit 300 is movable so that a projection angle of its display surface is adjusted means that an image output therefrom may be clearly viewed by a driver or passengers and a reflected angle of a rear view of a vehicle may be adjusted.

More specifically, the overhead console case 110 may include a moving mechanism 500 for moving the multi-display unit 300 so as to adjust a projection angle of the display surface.

Referring to FIG. 7, the moving mechanism 500 may be provided at either of laterally opposite ends of the multi-display unit 300 of the overhead console case 110. The moving mechanism 500 may operate not only to rotate an upper end or a lower end of the multi-display unit 300 forward or rearward about a horizontal rotating axis C2 extending through the horizontal center of the multi-display unit 300, but also to rotate a right end or a left end of the multi-display unit 300 forward or rearward about a vertical rotating axis C1 extending through the vertical center of the multi-display unit 300.

FIG. 7 illustrates the multi-display unit 300B which is moved at its upper end toward a driver's seat from a vertically disposed position by user manipulation.

As described above, the integrated overhead console assembly 100 for a vehicle according to the preferred embodiment of the present invention provides user convenience in that an inclined angle of the display surface of the multi-display unit 300 may be adjusted by a driver or a passenger.

The multi-display unit 300 may include a plurality of indicating switching elements 310A and 310B which are vertically and horizontally spaced apart from one another by predetermined intervals so as to allow a driver to adjust a vertical rotation angle and a horizontal rotation angle of the multi-display unit 300.

The plurality of indicating switching elements 310A and 310B may be classified into vertical rotation switching elements 310A for rotating an upper or lower end of the multi-display unit 300 forward or rearward about the horizontal axis, and horizontal rotation switching elements 310B for rotating a right or left end of the multi-display unit 300 forward or rearward about the vertical axis.

The vertical rotation switching elements 310A and the horizontal rotation switching elements 310B may be touch-screen switches that apply signals to the multi-display unit when a user's finger comes into contact therewith. However, the present invention should not be limited thereto and the switching elements may be provided as button type switches.

In addition to the plurality of indicating switching elements 310A and 310B for controlling the moving mechanism 500 adapted to adjust a projection angle of the display surface, the multi-display unit 300 may further include an indicator element (not shown) for indicating operational states of various functional operation components.

The plurality of indicating switching elements 310A and 310B and the indicator element are normally in a state of being turned off in order to decrease power consumption but are displayed through the multi-display unit when a driver or passenger intention to operate the elements, such as user access, is detected. More specifically, the elements may be displayed through a display member, which is one component of the multi-display unit 300 and will be described later, so that the information may be viewed by a driver or a passenger. In this regard, the driver or passenger intention to use the indicating switching elements 310A and 310B and the indicator element is preferably determined by detection of a driver or passenger access or touch.

Specifically, although not shown in the drawings, the multi-display unit 300 may include a display panel disposed in the front of the multi-display unit 300 to display an image taken by the camera module 200, and a reflection panel disposed behind the display panel and containing a polarization component to reflect and project a rear view image of a vehicle to a driver under inactive conditions of the multi-display unit 300.

The polarization component may be made of polarized glass containing a polarization material or a transparent object to which a polarization film containing a polarization material is attached. Furthermore, the polarization component may also be made of a transparent object containing material that is discolored upon application of power.

In operation of the polarization component, an image output through the display panel disposed in the front of the multi-display unit 300 is shielded by the polarization component, and thus a rear view image of a vehicle is reflected by the polarization component and thus is recognized by a driver or a passenger.

Meanwhile, when the polarization component is not operated, an image output through the display panel may be recognized by a driver or a passenger.

The integrated overhead console assembly 100 for a vehicle according to the embodiment of the present invention may further include a rear camera module (not shown) for taking a rear view image of a vehicle, and a both sides and rear camera module (not shown) for taking images of both side views and a rear view of the vehicle. However, the embodiment of the present invention may further include, in addition to the camera module 200 for taking a forward image of a vehicle in a direction of travel, a plurality of camera modules 200 which are oriented at various angles to capture images from around a vehicle. Therefore, the scope of the present invention should not be limited thereto.

The display panel of the multi-display unit 300 may be configured to have at least two split display surfaces for concurrently displaying respective images taken by the camera module 200, the rear camera module and the both sides and rear camera module.

Furthermore, the display panel may be configured to display all the images taken by the camera module 200, the rear camera module and the both sides and rear camera module in a panoramic fashion.

The integrated overhead console assembly 100 for a vehicle according to the preferred embodiment of the present invention may provide advantages in that various functional operation components including the camera module 200, the multi-display unit 300 and the interior illumination unit 120-121 and various components for operating the functional operation components may be compactly installed in the single overhead console case 110.

In addition, the integrated overhead console assembly 100 for a vehicle according to the preferred embodiment of the present invention may provide advantages in that the camera module 200, the multi-display unit 300 and the interior illumination unit 120-121 are provided with power which is supplied from a power supply installed at a vehicle body through a single wire (not shown) wired in the overhead console case 110, thus facilitating an efficient wiring design.

As specifically described above, the integrated overhead console assembly for a vehicle according to the embodiment of the present invention may provide the following effects.

1) Since the camera module for taking a forward image of a vehicle in a direction of travel may be stably installed and shielded from the outside, it is possible to more accurately detect running conditions of the vehicle.

2) Since various functional operation components including the camera module may be compactly installed, assembly by an assembler is facilitated.

3) Since heat generated from the camera module and the multi-display unit may be efficiently dissipated, product durability is improved.

4) Usage environments of various functional operation components may be improved by virtue of the overhead console case.

The integrated overhead console assembly for a vehicle according to a preferred embodiment of the present invention has been described in detail with reference to the accompanying drawings. However, the present invention is not limited to the preferred embodiments set forth herein, and those skilled in the art will appreciate that various modifications, additions and substitutions are possible, without departing from the scope and spirit of the present invention. Therefore, the true scope of the present invention should be interpreted by the accompanying claims.

What is claimed is:

1. An integrated overhead console assembly for a vehicle, comprising:
    a camera module configured to capture a forward image of a vehicle in a direction of travel, the camera module including:
        a lens for converging light constituting the forward image;
        an image sensor coupled to a rear end of the lens to detect the image converged through the lens; and
        an image processing board electrically connected to the image sensor;
    a multi-display unit configured to provide a driver with a display of the forward image or a reflection of a rear view image of the vehicle; and
    an overhead console case assembly providing an installation space for accommodating the camera module and the multi-display unit such that the camera module is hidden from an interior of the vehicle, whereas the multi-display unit is exposed to the interior of the vehicle,
    wherein the multi-display unit is spaced apart from the image processing board by a predetermined distance,
    wherein the lens comprises a pair of lenses, and the image sensor comprises a pair of image sensors,
    wherein the camera module comprises:
        a camera holder;
        a mounting part to which the pair of lenses and the pair of image sensors are coupled in a state of being longitudinally spaced apart from each other and through which the lenses and the image sensors are coupled to an upper surface of the camera holder; and
        a lower cover assembly which accommodates the image processing board and through which the image processing board is coupled to a lower surface of the camera holder, wherein the lower cover assembly is made of highly thermally conductive material, and is in contact with a heat generating region of the image processing board, and
    wherein the lower cover assembly comprises:
        an upper heat dissipation bracket disposed between the camera holder and the lower cover assembly to dissipate heat generated from the image processing board; and
        a lower heat dissipation bracket coupled to the upper heat dissipation bracket with the image processing board disposed therebetween,
        wherein a heat generating region of the image processing board contacts a heat transfer portion located at an inner surface of the lower heat dissipation bracket.

2. The integrated overhead console assembly for a vehicle according to claim 1, wherein the image processing board is horizontally disposed below the lens and the image sensor.

3. The integrated overhead console assembly for a vehicle according to claim 1, wherein the overhead console case assembly includes:
    a front end part configured to be coupled to an inner surface of a windshield glass; and
    a rear end part configured to be coupled to a roof inner panel constituting a ceiling surface of the interior of the vehicle.

4. The integrated overhead console assembly for a vehicle according to claim 1, further comprising an interior illumination unit provided at a rear end part of the overhead console case assembly and positioned opposite the camera module with respect to the multi-display unit so as to radiate light to the interior of the vehicle.

5. The integrated overhead console assembly for a vehicle according to claim 4, wherein the interior illumination unit comprises:
    an LED module disposed in the overhead console case assembly to radiate a predetermined amount of light;
    a printed-circuit board to which the LED module is fixed;
    a switch fixed to the printed-circuit board; and
    a push projector configured to actuate the switch and to radiate the light emitted from the LED module,
    wherein the push projector constitutes a portion of a lower surface of the overhead console case assembly.

6. The integrated overhead console assembly for a vehicle according to claim 5, wherein the push projector has a "U" shape arranged along a marginal region of a rear end of the overhead console case assembly.

7. The integrated overhead console assembly for a vehicle according to claim 1, wherein the overhead console case assembly includes:
    a microphone configured to detect sound generated from the interior of the vehicle;
    a black box configured to convert an image taken by the camera module and the sound detected by the microphone into data, and to store the data in the black box; and
    a speaker configured to output a predetermined sound to the interior of the vehicle.

8. The integrated overhead console assembly for a vehicle according to claim 7, wherein the integrated overhead console assembly is configured to:
    determine when there is a safety risk in running of the vehicle based on analysis of a forward image of the vehicle in a direction of travel taken by the camera module;
    output a predetermined alarm sound to the interior of the vehicle through the speaker;
    convert a sound in the interior of the vehicle detected by the microphone and the forward image captured by the camera module into data;
    store the data in the black box; and display the forward image of the vehicle through the multi-display unit.

9. The integrated overhead console assembly for a vehicle according to claim 8, wherein the overhead console case assembly further includes a transceiver for radio communication with a portable radio terminal, and wherein the forward image of the vehicle taken by the camera module or the data of the image and sound stored in the black box are configured to be checked through radio communication between the transceiver and the portable radio terminal according to user selection.

10. The integrated overhead console assembly for a vehicle according to claim 9, wherein data stored in the portable radio terminal is configured to be checked through radio communication between the transceiver and the multi-display unit according to user selection.

11. The integrated overhead console assembly for a vehicle according to claim 1, wherein the multi-display unit includes an image output LED module, and wherein the integrated overhead console assembly further comprises a thermal insulating member disposed in a space between the image sensors and the multi-display unit to prevent thermal interference between the image sensors and the image output LED module.

12. The integrated overhead console assembly for a vehicle according to claim 1, wherein one of the upper heat dissipation bracket and the lower heat dissipation bracket is bent at a rear end thereof to partition a space defined between the upper heat dissipation bracket and the lower dissipation bracket.

13. The integrated overhead console assembly for a vehicle according to claim 1, wherein the multi-display unit is movable to adjust a projection angle of a display surface of the multi-display unit.

14. The integrated overhead console assembly for a vehicle according to claim 13, wherein the overhead console case assembly includes a moving mechanism configured to move the multi-display unit to adjust the projection angle of the display surface.

15. The integrated overhead console assembly for a vehicle according to claim 1, wherein the overhead console case assembly includes a detector configured to monitor a user's line of sight, and wherein the multi-display unit is configured to move to adjust a projection angle of an image output display surface of the multi-display unit in a predetermined direction in accordance with the user's line of sight detected by the detector.

16. The integrated overhead console assembly for a vehicle according to claim 1, wherein the multi-display unit is movable to adjust a projection angle of a display surface for reflecting the rear view image of the vehicle to a driver, wherein the multi-display unit includes a plurality of indicating switching elements which are spaced apart from one another in horizontal and vertical directions, and wherein the plurality of indicating switching elements are configured to adjust moving extents of the multi-display unit in the horizontal and vertical directions by driver manipulation.

17. The integrated overhead console assembly for a vehicle according to claim 1, wherein the multi-display unit comprises:

a display panel disposed in a forward portion of the multi-display unit and configured to display an image captured by the camera module; and a reflection panel disposed on the display panel and containing a polarization component to reflect and project the rear view image of the vehicle to a driver under inactive conditions of the multi-display unit, wherein the polarization component includes one of polarized glass containing a polarization material, a polarization film containing a polarization material, and a material that is discolored upon application of power.

18. The integrated overhead console assembly for a vehicle according to claim 17, wherein the multi-display unit includes an indicator element for indicating operational states of various functional operation components provided in the vehicle.

* * * * *